Patented Oct. 21, 1947

2,429,460

UNITED STATES PATENT OFFICE 2,429,460

MANUFACTURE OF VINYL CYANIDE

Charles R. Harris, Lockport, and William C. Sharples, Niagara Falls, N. Y., assignors to E. I. du Pont de Nemours & Company, Wilmington, Del., a corporation of Delaware No Drawing. Application May 20, 1943, Serial No. 487,816

3 Claims. (Cl. 260—464)

This invention relates to the production of vinyl cyanide and more particularly to the reaction of acetylene with hydrogen cyanide by catalytic vapor phase processes.

Vinyl cyanide may be produced by reacting acetylene in the vapor phase with hydrogen cyanide in the presence of catalytic materials, for example, as described in German Patent 559,734. The catalyst for this reaction may consist of materials such as activated carbon, silica gel or the like. Suitable catalysts also may be prepared by coating or impregnating such materials or other catalyst supports with alkali or alkaline earth metal cyanides. Various other catalysts which may be utilized need not be disclosed in this specification since the present invention is not dependent upon the type of catalytic material used for the reaction.

In practicing this catalytic reaction, the gases coming from the catalyst mass are commonly passed through a condenser to condense out the vinyl cyanide formed by the reaction. The crude product thus obtained may be purified by distillation to remove any by-products or other impurities. We have discovered that in carrying out this process the yield of vinyl cyanide is often lowered by reason of secondary or decomposition reactions which tend to occur in the crude product while it is being condensed and during storage prior to purification by distillation. This necessitates distillation of the crude product as soon as possible after condensation; but in spite of all precautions considerable loss in yield occurs because of reactions occurring in the condenser, during transfer from the condenser to the still and during the distillation. The pure distillate is stable and not subject to the aforesaid reactions.

An object of this invention is an improvement in the process of making vinyl cyanide by catalytic reaction of acetylene with hydrogen cyanide. A further object is to provide means for preventing secondary reactions or decomposition from occurring in the crude product obtained by condensing off-gases from the aforesaid catalytic reaction. Another object is to enable storage of the crude product from the aforesaid reaction for long periods of time without reduction of its vinyl cyanide content.

We have further discovered that the above-mentioned secondary reactions in the crude product can be substantially completely inhibited by maintaining the condensed material in an acid condition. This is accomplished in accordance with our invention by adding an acidic material to the crude liquid vinyl cyanide obtained by condensing the gases issuing from the catalytic reaction. For this purpose, we may use one of the common inorganic or organic acids, for example, sulfur dioxide or its hydrate, sulfuric acid, hydrochloric acid, nitric acid, chloric acid, phosphoric acid, acetic acid, oxalic acid, propionic acid, lactic acid, tartaric acid or glycolic acid. We may also use salts having acid reaction, such as sodium dihydrogen phosphate, zinc sulfate, aluminum chloride and the like. We prefer to use acidic materials which are substantially non-corrosive, so as to permit handling in distillation of an acidified product in ordinary steel equipment without corrosion of the same. Phosphoric acid and sodium dihydrogen phosphate are examples of such non-corrosive acidic materials.

We have found that the best results are obtained when the amount of the acidic material added is such that a water extract obtained by shaking 10 cc. of the acidified condensate with 25 cc. of water at room temperature will have a pH below 4.6, for example, a pH of 2 to 4.5. Some inhibition of the undesired reactions will occur at somewhat higher pH values, but in any event sufficient acid material must be added to give a pH value below 7 in the above-described water extraction test. Water may be added to the acidic material if desired; preferably the amount of water should be not more than 10 to 15% by weight of the acidic material utilized. The acidic material may be added in solution in water, or other suitable solvent, if desired. Those acid materials which have deleterious effects on organic compounds in their anhydrous state or in concentrated solution, for example, sulfuric acid and nitric acid should be added as solutions of suitably dilute concentrations. We prefer to avoid the presence of water and to add acidic materials in substantially anhydrous condition, selecting those acids which are substantially non-reactive with vinyl cyanide.

To obtain the full benefit of our invention, it is preferable to add the acidic material to the product as it is condensed, for example, by introducing the acid intermittently or continuously into the condensing apparatus. If the acidic material is a gas, such as sulfur dioxide or hydrogen chloride, it may be introduced as a gas at some point in the system before condensation has taken place. However, the acid is effective whenever added and considerable advantage is realized in acidifying the condensate issuing from the condenser, for example, adding the acid to the receiver.

Example

A mixture of HCN and acetlyene was passed over a catalyst consisting of sodium cyanide supported on activated carbon at 450 to 550° C. The product gas was passed through several condensers cooled with a mixture of solid carbon dioxide and methanol, provided with product collection traps. The crude condensate thus obtained was allowed to warm up to room temperature while standing over night. The crude condensate then was fractionally distilled to completely recover vinyl cyanide therefrom. The vinyl cyanide thus recovered was 10% by weight of the crude condensate.

The above procedure was repeated, except that a small amount of glacial acetic acid was added to the product traps of the condensers before starting the reaction. The amount of acid was sufficient to maintain the crude condensate in an acid condition. In this case the recovered vinyl cyanide was 66% by weight of the crude condensate.

We have found that by means of our invention the condensate obtained by condensing vapor from the catalytic reaction of hydrogen cyanide and acetylene may be stored for indefinite periods of time without substantial chemical change therein. We have also found that in making vinyl cyanide by the above-described method, the acidification of the condensate as above-described has resulted in a marked increase of the ultimate yield of purified vinyl cyanide.

We claim:

1. In a process for the production of vinyl cyanide by reacting acetylene with hydrocyanic acid at a temperature between 450° C. and 550° C. in the presence of a member of the group consisting of alkali metal and alkaline earth metal cyanides and condensing the vinyl cyanide vapors, the step of inhibiting loss of said vinyl cyanide by decomposition and secondary reactions which comprises condensing the vinyl cyanide vapors in the presence of sufficient added acidic material taken from the group consisting of acids and acid salts that an aqueous extract obtained by shaking 1.0 volume of said condensate with 2.5 volumes of water will have a pH below 4.6, said acidified condensed product containing less than 15% water based on the weight of the added acidic material.

2. The process of claim 1 in which said added acidic material is acetic acid.

3. The process of claim 1 in which said added acidic material is phosphoric acid.

CHARLES R. HARRIS.
WILLIAM C. SHARPLES.

REFERENCES CITED

The following references are of record in the file of this patent:

UNITED STATES PATENTS

| Number | Name | Date |
|---|---|---|
| 2,389,607 | Britton et al. | Nov. 27, 1945 |
| 2,171,795 | Kautter | Sept. 5, 1939 |
| 2,356,247 | Kirk et al. | Aug. 22, 1944 |
| 2,073,363 | Carothers et al. | Mar. 9, 1937 |
| 2,208,328 | Lichty | July 16, 1940 |
| 2,264,026 | Gudgeon | Nov. 25, 1941 |
| 2,301,131 | Lichty | Nov. 3, 1942 |
| 2,322,696 | Kurtz et al. | June 22, 1943 |
| 2,324,854 | Kurtz et al. | July 20, 1943 |
| 2,326,095 | D'Ianni | Aug. 3, 1943 |
| 2,328,890 | Clifford et al. | Sept. 7, 1943 |
| 2,259,513 | Barnes | Oct. 21, 1941 |

FOREIGN PATENTS

| Number | Country | Date |
|---|---|---|
| 217,478 | Switzerland | Feb. 2, 1942 |
| 427,810 | Great Britain | Apr. 30, 1935 |
| 559,734 | Germany | Sept. 23, 1932 |